May 26, 1970  A. KORPEL  3,514,534
WIDE-APERTURE LASER BEAM MODULATING AND SCANNING SYSTEM
Filed Dec. 9, 1966

Inventor
Adrianus Korpel
By Hugh S. Drake
Attorney

United States Patent Office 3,514,534
Patented May 26, 1970

3,514,534
WIDE-APERTURE LASER BEAM MODULATING AND SCANNING SYSTEM
Adrianus Korpel, Prospect Heights, Ill., assignor to Zenith Radio Corporation, Chicago, Ill., a corporation of Delaware
Filed Dec. 9, 1966, Ser. No. 600,430
Int. Cl. H04n 3/10
U.S. Cl. 178—7.5                                2 Claims

ABSTRACT OF THE DISCLOSURE

Greatly improved high-frequency response is obtained in a laser TV display system of the type employing Bragg diffraction cells for video modulation and for horizontal deflection, by using a wide-aperture light beam and spacing the scanning cell downbeam from the video modulating cell at an appropriate effective optical distance to image the sound pattern in the modulating cell on the display screen. With this system, spatial coherence is not required in the dimension corresponding to the direction of sound propagation in the modulating cell.

---

Figure 1:
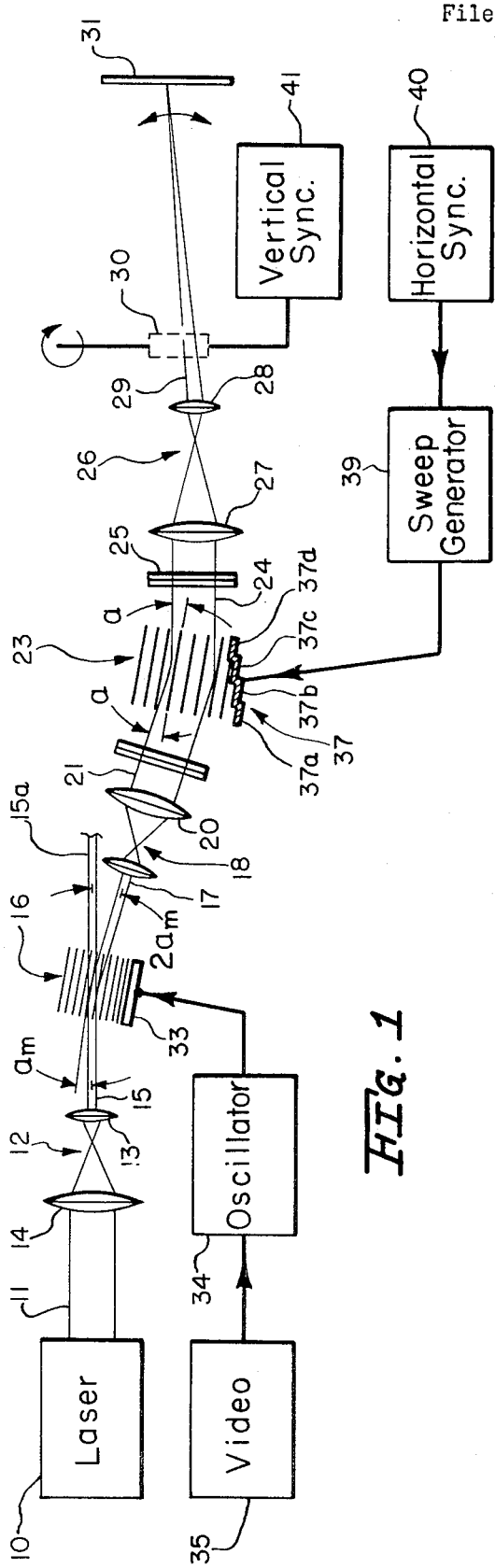

The present application pertains to display systems. More particularly, it relates to a system for modulating and deflecting a beam of light to provide an image display. As utilized herein, the term light includes electromagnetic radiation in both the visible and invisible portions of the spectrum and the terms acoustic and sound pertain to acoustic waves in both the audible and superaudible ranges.

As disclosed in the copending applications of Robert Adler, Ser. No. 388,589, filed Aug. 10, 1964, now U.S. Pat. 3,431,504, issued Mar. 4, 1969, and Ser. No. 476,797, filed Aug. 3, 1965, a beam of light from a source such as a laser may be modulated with intelligence information by propagating sound waves representative of the modulation of the light at an angle appropriate to cause diffraction of the light by the sound wavefronts. In this manner, the diffracted light is modulated in intensity in accordance with video signals modulated upon the sound energy. Somewhat similarly, by varying the frequency of sound waves propagated across the light beam, the beam may be caused to be deflected or scanned in a given direction across an image plane. By including means for effecting scanning of the beam in the orthogonal direction a complete image raster may be defined.

Prior art ultrasonic light-beam modulators have a frequency response which depends upon the transit time of the sound wave across the light beam. For a light beam of uniform intensity across a given distance, the response falls to zero when the modulation wavelength equals that distance. To obtain good high-frequency response, the prior art approaches, therefore, utilize a very narrow beam of light.

In attempting to improve high-frequency response, it is possible to constrict the beam in size even further but this gives rise to an undesirable increase in diffraction spread of the light. When that diffraction spread approaches the diffraction spread of the sound waves, a significant portion of the light bypasses interaction with this sound wave. It is also possible with the prior approaches to increase the sound velocity and reduce the distance the light travels across the sound wavefronts, but this results in the necessity of substantially increasing the sound power. The response may additionally be improved by reducing the sound-carrier frequency, but the resulting increased fractional bandwidth necessitates a more complex transducer element for developing and launching the sound waves.

It is accordingly a general object of the present invention to provide a sound-light modulator which overcomes the disadvantages and difficulties of such prior systems.

It is another object of the present invention to provide an image display system which includes a sound-light modulator that minimizes loss of resolution in the display resulting from the modulation process.

It is a further object of the present invention to provide a display system in which a beam of light is caused to scan in a predetermined direction and in which the light may be spatially incoherent in that direction.

A display system in accordance with the present invention includes means for producing a beam of substantially monochromatic light together with means for directing across the path of that beam sound waves propagating at a predetermined velocity. Intensity variations between successive groups of the sound waves represent display elements with a plurality of these groups simultaneously intercepting the light beam. Disposed downstream of the directing means are means for guiding across the path of the beam acoustic waves which interact with the light to diffract the light beam at an angular rate corresponding to the propagation velocity of the sound waves. The system further includes means defining an image plane together with means imaging the aforesaid intensity variations upon that image plane.

Figure 2:
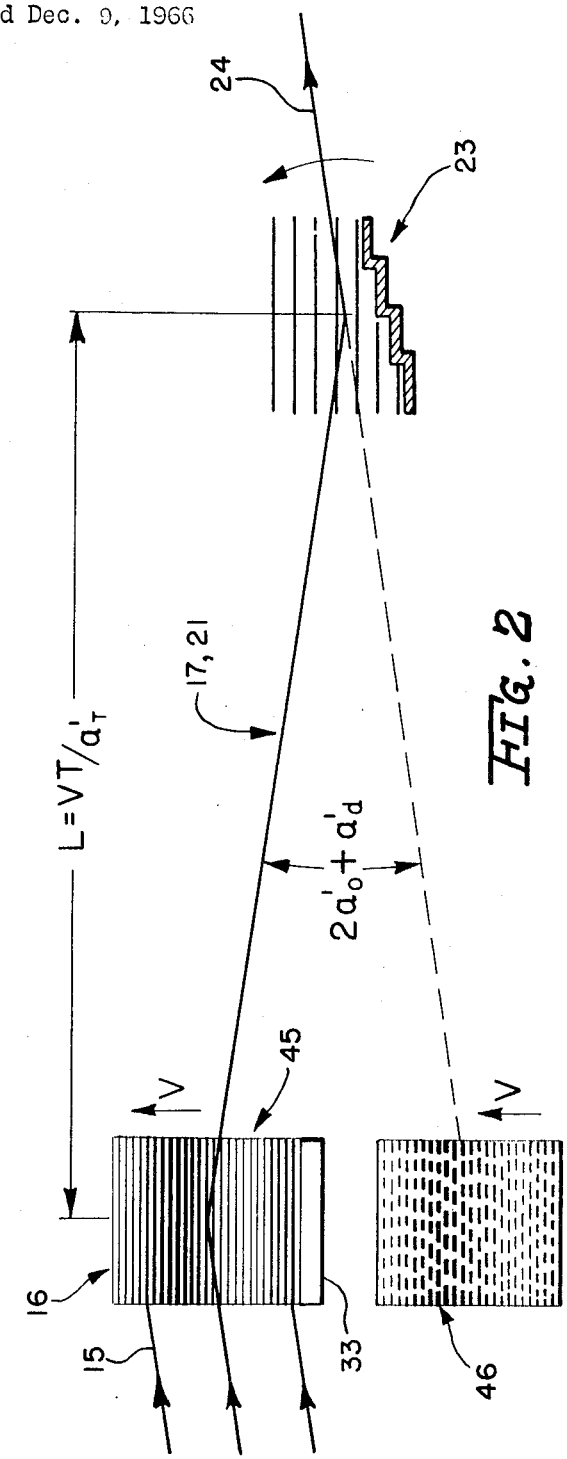

The features of the present invention which are believed to be novel are set forth with particularity in the appended claims. The invention, together with further objects and advantages thereof, may best be understood, however, by reference to the following description taken in connection with the accompanying drawing in the several figures of which like reference numerals indicate like elements and in which:

FIG. 1 is a schematic diagram of a display system constructed in accordance with the present invention; and FIG. 2 is a schematic representation useful in understanding the operation of the system of FIG. 1.

As illustrated in FIG. 1, a display system includes a source 10 of substantially monochromatic light. In this case, source 10 is a laser productive of a beam 11 which is projected through a reverse telescope 12 having an eye-piece 13 and an object lens 14. The reduced-diameter beam 15 emerging from telescope 12 traverses a modulator 16. Some of the light in beam 15 ordinarily exits from modulator 16 along a path 15a; in this case, that light is not used. The significant portion of beam 15 acted upon by the modulator is diffracted at an angle to path 15a and exits as a beam 17 which enters a telescope 18 having an eye-piece and an object lens 20.

Telescope 18 enlarges the circular cross-section of the light so that it emerges in the form of a beam 21 which then traverses a cylinder lens before entering an acoustic deflector 23. A portion of the light entering deflector 23 is diffracted as a beam 24 which traverses a second cylinder lens 25 and then enters another reverse telescope 26 having an object lens 27 and an eye-piece 28. Telescope 26 reduces the cross-sectional area of the light and projects a beam 29 through a vertical deflector 30 from which the beam continues on to an image screen 31.

In the system of FIG. 1, both modulator 16 and horizontal deflector 23 function to direct or guide sound or acoustic waves across the path of the light beam. Modulation or deflectioin, as the case may be, occurs because the sound waves intercept and interact with the light. The sound waves form a moving three-dimensional phase grating which diffracts the light. To this end, both modulator 16 and deflector 23 take the form of a light-sound interaction cell basically of the kind disclosed in the copending application of Robert Adler Ser. No. 388,589, filed Aug. 10, 1964, and assigned to the same assignee as the present application. The cell is in the form of a container having side walls transparent to the light and filled with a medium such as water propagative of both the light and the sound. In modulator 16, one end-wall of the cell is an electro mechanical transducer 33 which typically includes an X-cut quartz crystal slab sandwiched between conductive electrodes across which a signal source is coupled. In this instance, the signal source is an oscillator 34 which develops a carrier signal which is in turn modulated by intelligence to be displayed from a video signal source 35.

Deflector 23 as utilized in the illustrative embodiments is likewise a light-sound interaction cell composed of a container filled with a sound and light propagating medium such as water, having side walls transparent to the light and having a transducer 37 at one end to launch acoustic waves into the medium. Deflector 23 may be constructed as described in the aforesaid application Ser. No. 388,589; it alternatively may be of the type shown in Adler application Ser. Nos. 476,797, 476,798 (now Pat. 3,419,322 issued Dec. 31, 1968) or 476,873 (now Pat. 3,373,380 issued Mar. 12, 1968) filed Aug. 3, 1965, or of the type disclosed in the Adrianus Korpel application Ser. No. 517,630, filed Dec. 30, 1965, and issued Jan. 28, 1969, as Pat. 3,424,906. However as preferably utilized herein it takes the specific form disclosed and claimed in the copending Adler application Ser. No. 600,500, filed Dec. 9, 1966. All of these applications are assigned to the same assignee as the present application. As thus constructed, advantage is also taken of features disclosed and claimed in each of the earlier-filed ones of these applications. In this arrangement, then, transducer 37 is in actuality a transducer assembly composed of a plurality of individual transducers 37a–37d disposed laterally adjacent one to the next and from one to the next spaced in the direction of sound propagation by one-half the frequency at the center of a range of frequencies through which the sound is varied. Additionally, transducers 37a–37d are so coupled to a sweep-signal generator 39 that adjacent ones of the transducers are instantaneously energized in phase position.

The purpose of utilizing a transducer assembly composed of a plurality of individual transducers arranged and energized as described is to cause the resulting composite sound wavefronts to tilt away from the position illustrated as the sound frequency changes so as to maintain more optimum angular orientation relative to the incoming light beam and thereby fully and efficiently diffract the light beam throughout the deflection sweep range. When instead using a single, flat transducer in deflector 23, the range of available deflection angles is substantially reduced over that obtainable with the construction here preferred.

As also explained in detail in application Ser. No. 600,500, the sound beam launched by transducer assembly 37 is comparatively wide in the direction of light travel and of relatively narrow height in the direction perpendicular to the plane of the paper in FIG. 1. For efficient sound deflection, it is desired that the light beam entering deflector 23 also be of narrow height but wide in the direction of sound propagation. Consequently, cylinder lens 22 disposed in the path of light beam 21 focuses the beam to a wedge-shaped cross-over within the sound path in deflection cell 23. Correspondingly, cylinder lens 25 acts upon beam 24 emerging from deflector 23 to restore the beam to a circular cross-section. Moreover, as described in application Ser. No. 476,797, the use of an incoming light beam wide in the direction of sound propagation together with a linearly changing sweep signal from generator 39 results in action by deflector 23 as if it too were a cylinder lens.

Completing the elements of the illustrated system for use in providing a television image display is the conventional horizontal synchronizing system 40 for controlling sweep generator 39 and an analogous vertical synchronizing and sweep system 41 for controlling vertical deflector 30. While vertical deflector 30 may take various forms and indeed may itself be another light-sound interaction cell, because of the typically very-low vertical deflection rate in television displays the illustrated embodiment employs a conventional optical system including a mirror which is caused to tilt at the vertical rate by a galvanometer element.

In both modulator 16 and deflector 23, the sound or acoustic wavefronts are caused to intersect the incoming light beam at least substantially at what is known as the Bragg angle, designated $\alpha$ in FIG. 1 with respect to deflector 23 and $\alpha_m$ as to modulator 16. With this relationship, the sound or acoustic wavefronts act like moving mirrors with the light being reflected from the mirrors at an exit angle equal to the incidence angle. Consequently, the light exits from the light-sound cells at the same angle $\alpha$ or $\alpha_m$ relative to the sound wavefronts and at the angle $2\alpha$ or $2\alpha_m$, as the case may be, relative to the path of the undiffracted light. This is illustrated in FIG. 1 by the angle $2\alpha_m$ between diffracted light path 17 and the path of the undiffracted light 15a.

To understand the operation of the system more clearly, it is helpful to examine in more detail the relationships attendant to Bragg-angle diffraction by means of light-sound interaction. For convenience, reference is made to angle $\alpha$, although a corresponding Bragg relationship holds for $\alpha_m$.

Signal sources 34 and 39 impress signals across transducers 33 and 37 which in turn launch sound waves of individual periods $\Lambda$ and width $x$ into the water of the cells. The direction $y$ of sound propagation, therefore, is selected in each cell relative to the direction of incoming light propagation to achieve Bragg reflection. When the wavefront width $x$ is greater than the valve of $\Lambda^2/\lambda$, where $\lambda$ is the wavelength of the light, the incident light is diffracted only into a first order and this occurs to a significant degree when the directions of incident and diffracted light are at least approximately symmetrical with respect to the acoustic or sound wavefronts. The angle between the diffracted and undiffracted light beams is equal to $2\alpha$, where $\alpha$ is the Bragg angle determined in accordance with a relationship:

$$\sin \alpha = \lambda/2\Lambda \qquad (1)$$

The cells are bounded by flat, parallel faces through which the light enters and leaves; these faces are at least approximately perpendicular to the acoustic wavefronts. With the cells disposed in air, the relation between the Bragg angle $\alpha'$ in air and the angle $\alpha$ in the actual sound propagating medium is determined by Snell's law:

$$\sin \alpha'/\sin \alpha = n = \lambda'/\lambda \qquad (2)$$

where $n$ is the index of refraction of the medium and $\lambda'$ is the light wavelength in air. Consequently, the externally observed Bragg angle is expressed:

$$\sin \alpha' = \lambda'/2\Lambda \quad (3)$$

As defined herein, optical wavelengths and angles measured in air as designated by primed symbols. From Equation 3 the angle as measured in air between the undiffracted and diffracted light beams is $2\alpha'$.

Since the latter value depends upon the value of $1/\Lambda$ and hence on the acoustic frequency $f$, it is possible to vary the direction of the diffracted light in deflector 23 by changing the acoustic frequency and this is what occurs in the system of FIG. 1. As the frequency of the signal from source 39 is changed throughout a finite range, beam 29 similarly scans across screen 31 from one side to the other.

Because of the use of telescope 26 to magnify the actual scan angle, the needed change $\alpha_d$ of the diffraction angle $\alpha$ is very small and, moreover, in the embodiment described the diffraction angle $\alpha$ is less than 1 degree. Since for that small an angle the value of $\sin \alpha$ approximates $\alpha$, for practical purposes Equation 1 may be rewritten $$\alpha = \lambda/2\Lambda \quad (4)$$

Where a sound wave of wavelength $\Lambda_0$ and a frequency $f_0$ travels upward in the cell at a sound velocity $V$, the sound waves diffract the exiting light into a new direction separated from the original direction of light propagation by an angle $$2\alpha_0 = \lambda/\Lambda_0 = f_0\lambda/V \quad (5)$$

For convenience, the exit angle for sound waves of frequency $f_0$ is defined as the center sound frequency of the range of frequencies over which the sound is changed in deflector 23 and corresponds to a nominal or center position of the beam exiting from that cell. For a change of frequency by an amount $\Delta f$, the exiting beam angle from cell 23 is changed by the amount $$\alpha_d = \lambda \Delta f / V \quad (6)$$

For a given maximum value of $\Delta f$ dependent upon the range of operation of transducer 37, there is a resulting maximum deflection angle $\alpha_T$. The diffracted beam has the same shape as the original beam and in the illustrated case also has uniform power density over the aperture width $D$. Assuming spatial coherence across the aperture, the beam is spread only by diffraction with the first nulls of the far-field pattern separated from the central maximum by angles of $\pm \lambda/D$. Following conventional notation in defining the value $\lambda/D$ as the smallest resolvable angle $\alpha_{min}$, the resolution $N$ is expressed $$N = \alpha_T/\alpha_{min} = D\Delta_f/V = \tau \Delta f \quad (7)$$

where $\tau$ is the transit time of the sound wave across the aperture width $D$. It may be noted also that the value $\tau f_0$ represents the number of sound waves present within the aperture at an instant when the sound frequency $f = f_0$; the quantity $\tau \Delta f$, in Equation 7 is the number of waves added when the acoustic frequency is changed from its minimum to its maximum value. Correspondingly, the externally measured maximum deflection angle becomes $\alpha'_T = \lambda' \Delta f/V$ and the smallest resolvable angle $$\alpha'_{min} = \lambda'/D$$

The resolution $N$ remains the same.

When utilizing a linear scan as in the case of the deflection in a television system, the deflection angle $\alpha'_d$ is changed at a constant rate $$d/dt(\alpha'_d) = \alpha'_T/T \quad (8)$$

where $T$ in this example is the horizontal trace time. The deflection angle as a function of time and distance in the cell is therefore expressed:

$$\alpha'_d(t, y) = \alpha'_T/T(t - y/V) \quad (9)$$

The distribution of deflection angles at any given instant is characterized by a gradient $$d/dy(\alpha'_d) = -\alpha'_T/VT \quad (10)$$

which is independent of time $t$ and direction $y$. Thus, the deflection angle changes at a uniform rate along the $y$ axis, and the deflected light rays come to a focus at a constant distance $VT/\alpha'_T$. Consequently, the linear frequency-modulated sound wave acts as if there were an additional cylinder lens of fixed focal length in the system.

Since, then, the transit time $\tau$ may have substantial magnitude, an exemplary system is able to have an aperture width $D$ of 19 millimeters which in water, having a sound velocity $V$ of 1500 meters per second, results in a transit time of 12.5 microseconds. This conveniently is approximately equal to the horizontal retrace blanking interval of present-day television standards. The acoustic frequency is modulated with a sawtooth function having negligible fly back time. The steep transient separating the end of one sawtooth from the beginning of the next travels across the entire aperture width $D$ during the conventional television system blanking interval.

In addition to the optical aperture width $D$, it is also important to consider the optical length $x$ across the sound beam. As previously noted, the sound beam width $x$ must be greater than $\Lambda^2/\lambda$. Also to be considered are the acoustic power required to deflect all incoming light and the tolerance on the angle under which the light enters. These considerations are fully developed in the aforesaid application Ser. No. 600,500.

Turning now in more detail to modulator 16, in a typical embodiment transducer 33 develops a sound beam 18 millimeters wide in the direction of light propagation and 3 millimeters high in the water utilized as the sound propagating medium. Following conventional television practice, oscillator 34 develops a carrier signal of 41.5 megahertz and the video intelligence occupies a frequency range of about 41 to 45 megahertz. Thus, the 41.5 mHz. carrier is placed near one edge on the signal band and is amplitude modulated with a vestigial side band representative of the video information. Either positive or negative modulation may be applied, permitting the use of either the diffracted beam 17 or undiffracted beam 15a. However, with the particular cell design described it has been found possible to remove only about 95 percent of the light from undiffracted beam 15a and the remaining portion limits the obtainable image contrast. Consequently, it is preferred to use diffracted beam 17 as illustrated since the modulator is capable of reducing the amount of light in the diffracted beam to zero intensity.

In actual practice, video source 35 is a video amplifier of a conventional television receiver. That receiver also supplies the vertical and horizontal synchronizing and sweep signals thereby performing the functions of generator 39 and synchronizing systems 40 and 41. Consequently, the overall system displays a standard television signal broadcast over the air, with modulator 16 and the system of deflector 23 together with laser 10 taking the place of the conventional cathode-ray tube and its directly auxiliary components. In that utilization, it is found that modulator 16 exhibits a generally S-shaped modulation characteristic. This is compensated for by a simple nonlinear network included in the video circuitry of the receiver. Similarly, video source 35 depicted in FIG. 1 includes such a compensating nonlinear network.

Broadly, it has been known for many years to video-modulate an acoustic wave across which a beam of light is projected, as described by F. Okolicsanyi in an article entitled "The Wave-Slot, an Optical Television System," The Wireless Engineer, vol. 14, pp. 527–536, October 1937 and in another article by D. M. Robinson, "The Supersonic Light Control and Its Application to Television with Special Reference to the Scophony Television Receiver," Proceedings of the I.R.E., vol. 27, pp. 483–486, August 1939. In those systems, the sound wave carries with it a visible replica of the video signal received during an immediately preceding time interval. Instead of attempting to form a spot of element size on the screen as described in the introduction hereto with respect to prior light-sound interaction modulation systems, an image of the light-sound cell is formed on an image screen. The video details in terms of light and shading move along the projected image at a speed corresponding to the velocity of the sound. These prior ultrasonic systems, then, utilized a mirror polygon to cause the whole image to move across the screen at that same speed but in the opposite direction so that the image details were immobilized on the screen.

The present invention takes advantage of this underlying principle of immobilizing on an image screen a visible replica of the video information. FIG. 2 depicts a sucession of sound waves 45 within modulator light-sound cell 16. Incoming light beam 15 has a sufficient width in the direction of sound propagation, indicated by the arrow labeled V representing the sound wave velocity, to encompass several picture elements. Four such elements are shown within the aperture width of the light in FIG. 2 by means of alternating series of light and dark sound wavefronts. These elements, which move upward at sound velocity V, are imaged in the plane of screen 31 (FIG. 1) through deflector 23 by telescopes 18 and 26. Neglecting the cylinder lens effect of deflector 23 for convenience of illustration, the light beam is turned in the deflector by an angle $2\alpha'_0 + \alpha'_d$. As a result, beam 24 emerging from deflector 23 appears to come from a virtual image 46 of the sound waves in modulator 16, as shown by the dashed sound wavefront pattern in FIG. 2.

Deflector 23 displaces the image of the sound waves in the modulator but does not reverse that image; virtual image 46 still moves upward at velocity V. To immobilize this motion, the incremental deflection $\alpha'_d$ is caused to increase by a compensatory amount. The derivative of the deflection angle increase is $d/dt(\alpha'_d) = \alpha'_T/T$, where it will be recalled that $\alpha'_T$ is the maximum deflection angle and T is the horizontal trace time. In order to obtain the desired compensation in the present system, it is necessary that the sound propagation velocity in cell 16 satisfy the relationship $$V = L\alpha'_T/T \tag{11}$$

where L is the center-to-center spacing between the sound waves respectively in modulator 16 and deflector 23. In a given system where the sound velocity, the horizontal trace time and the maximum deflection angle of deflector 23 are determined in accordance with considerations independently selected with respect to the desired features or the desired characteristics of the individual light-sound cells and of the television system itself, the desired compensation or immobilization is obtained by selecting length L to satisfy the relationship $$L = VT/\alpha'_T \tag{12}$$

Having thus correlated the action of deflector 23 with the movement of the image in modulator 16 so as to immobilize the picture elements in the modulator imaged upon screen 31, the overall system of FIG. 1 operates to display a complete television image when video source 35 is the video amplifier of the television receiver previously described. Moreover, with the distance L between the modulator and deflector selected in accordance with Equation 12, the previously-mentioned apparent cylinder-lens effect produced by the frequency-modulated wave in deflector 23 eliminates the astigmatism in the system by placing the virtual image at infinity. Consequently, the process is not astigmatic. This occurs because the quantity $VT/\alpha'_T$ also is equal to the focal length of deflector 23.

In a typical embodiment in which the center frequency $f_0$ of the sweep signals applied to deflector 23 is 28 megahertz and the total frequency swing $\Delta f$ of that sweep signal is 16 megahertz, $\alpha'_T$ is 6.8 milliradians and Equation 12 yields a value for distance L of 14 meters. That distance is reduced to the more convenient value of about 1.4 meters by assigning a magnification of ×10 to telescope 18 which is focused at infinity. The width of beam 15 entering modulator 16 is about 2 millimeters in the direction of sound propagation so as to embrace nearly 6 full cycles of the highest video-signal frequency to be produced. Telescope 13 is of comparatively low power (×2) to compress the laser beam to a diameter suitable for modulator 16. The ×10 power of telescope 18 also expands the beam so as to have a comparatively wide width during passage through deflector 23. The resulting deflection angle introduced by deflector 23 is magnified by telescope 26 by a power of ×15, enabling image screen 31 to be brought 15 times closer. The described system exhibits a resolution of approximately 200. Satisfactory reproduction of a typical video signal having frequency components up to about 3 megacycles is obtained.

Utilization of the system described above avoids resolution losses previously experienced with comparatively narrow-beam video modulators. Moreover, since each beam spot on image screen 31 is a conventional image of a corresponding spot in modulator 16, the light from source 10 may be incoherent in the horizontal direction. With the particular system illustrated, spatial coherence is still desired in the vertical direction in order to produce a small spot on image screen 31; however, because of its slow rate the vertical deflection is so easily obtained that the requirement of vertical spatial coherence may be somewhat relaxed. Consequently, the system is adaptable to the use of light sources other than lasers although the beam of light utilized should have good collimation to prevent loss of light and should exhibit a monochromaticity of the order of at least 1 part in 1000 in view of the requirements of acoustic deflector 23.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. An image display system comprising:
   a first Bragg diffraction light-sound interaction cell including a transducer coupled to an acoustic wave transmitting medium characterized by a predetermined acoustic wave propagation velocity;
   a video modulating signal source coupled to said transducer for propagating intensity-modulated acoustic waves in said medium;
   means for projecting through said medium in a direction transverse to said acoustic waves a substantially monochromatic light beam of a width large relative to the acoustic wavelength in said medium for all frequency components of said modulating signal to produce in said first cell a moving image of the picture elements corresponding to said modulating signal;
   and a deflection scanning system for sweeping the intensity-modulated light beam from said first cell across an image plane, said scanning system including a second Bragg diffraction cell spaced downbeam from said first cell and responsive to a periodic scanning signal for projecting frequency-modulated acoustic waves across the path of said light beam in the same plane as said first Bragg diffraction cell, to diffract said beam in a direction opposite to the direction of diffraction of said light beam by said first cell, with a predetermined maximum deflection angle during a predetermined deflection trace interval;
   and the effective optical spacing of said second cell along said beam from said first cell being substantially equal to the product of said predetermined propagation velocity, said predetermined trace interval, and the reciprocal of said maximum deflection angle, whereby said second Bragg cell compensates the motion of said image in said first Bragg cell to establish a stationary image of said picture elements in said image plane.

2. An image display system according to claim 1, in which a telescope focused at infinity is provided in the path of said light beam between said first and second Bragg diffraction cells, and the actual physical spacing along said beam between said cells is less than said effective optical spacing by a factor corresponding to the magnification power of said telescope.

References Cited

UNITED STATES PATENTS

| 2,155,659 | 4/1939 | Jeffree | 350—161 |
| 2,797,619 | 7/1957 | Rosenthal. | |
| 3,055,258 | 9/1962 | Hurvitz | 350—161 |

ROBERT L. GRIFFIN, Primary Examiner

A. H. EDDLEMAN, Assistant Examiner

U.S. Cl. X.R.

350—161